(12) United States Patent
Borovikov et al.

(10) Patent No.: US 9,742,769 B2
(45) Date of Patent: Aug. 22, 2017

(54) METHOD AND SYSTEM FOR DETERMINING TRUSTED WIRELESS ACCESS POINTS

(71) Applicant: Kaspersky Lab ZAO, Moscow (RU)

(72) Inventors: Nikolay V. Borovikov, Moscow (RU); Victor V. Yablokov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 171 days.

(21) Appl. No.: 14/312,838

(22) Filed: Jun. 24, 2014

(65) Prior Publication Data

US 2015/0341358 A1    Nov. 26, 2015

(30) Foreign Application Priority Data

May 26, 2014 (RU) ................................ 2014121040

(51) Int. Cl.
| | |
|---|---|
| *H04L 29/06* | (2006.01) |
| *H04W 12/08* | (2009.01) |
| *H04W 12/12* | (2009.01) |

(52) U.S. Cl.
CPC ............. *H04L 63/10* (2013.01); *H04W 12/08* (2013.01); *H04W 12/12* (2013.01)

(58) Field of Classification Search
CPC . H04L 63/10; H04L 63/1416; H04L 63/0428; H04L 29/06; G06F 21/10; G06F 21/31; G11B 20/00086
USPC ......................................................... 726/27
See application file for complete search history.

(56) References Cited

U.S. PATENT DOCUMENTS

| | | | |
|---|---|---|---|
| 7,277,409 B1 | 10/2007 | Thermond et al. | |
| 8,413,213 B2 | 4/2013 | Glickman | |
| 8,537,715 B1 | 9/2013 | Vadivelu | |
| 2003/0119484 A1 | 6/2003 | Adachi et al. | |
| 2005/0055578 A1 | 3/2005 | Wright et al. | |
| 2010/0278158 A1* | 11/2010 | Lee ........................ | H04W 48/20 370/338 |
| 2011/0183675 A1 | 7/2011 | Bae et al. | |
| 2011/0208866 A1* | 8/201 | Marmolejo-Meillon | H04L 63/0823 709/227 |
| 2011/0299422 A1* | 12/2011 | Kim ....................... | H04W 48/16 370/253 |

(Continued)

FOREIGN PATENT DOCUMENTS

| | | |
|---|---|---|
| CN | 103024929 A | 4/2013 |
| RU | 2459374 A | 11/2011 |

(Continued)

*Primary Examiner* — Ali Abyaneh
(74) *Attorney, Agent, or Firm* — Arent Fox LLP; Michael Fainberg

(57) ABSTRACT

Disclosed are systems and method for determining trusted wireless access points. An example method includes identifying, by a mobile device, one or more wireless access points are available to connect to a network resource; obtaining a plurality of access point characteristics of the one or more wireless access points; obtaining a plurality of network resource characteristics for connecting to the network resource; comparing the plurality of access point characteristics and the plurality of network resource characteristics; determining based on the comparison at least one trusted wireless access points that is acceptable for establishing a connection to the network resource; and establishing a connection to the network resource via the trusted wireless access point.

20 Claims, 4 Drawing Sheets

(56) References Cited

U.S. PATENT DOCUMENTS

2012/0263051 A1 10/2012 Willars et al.
2013/0040603 A1* 2/2013 Stahlberg .............. H04L 63/126
 455/410

FOREIGN PATENT DOCUMENTS

RU 2012116048 A 11/2013
WO 2006093634 A1 9/2006
WO 2013023966 A1 2/2013

* cited by examiner

METHOD AND SYSTEM FOR DETERMINING TRUSTED WIRELESS ACCESS POINTS

CROSS-REFERENCE TO RELATED APPLICATIONS

The present disclosure claims benefit of priority under 35 U.S.C. 119(a)-(d) to a Russian Application No. 2014121040 filed on May 26, 2014, which is incorporated by reference herein.

TECHNICAL FIELD

The present disclosure relates generally to the field of networks security and, more specifically, to systems and methods of determining trusted wireless access points.

BACKGROUND

The development of wireless technologies has increased opportunities to access to the Internet. There is a constant growth in the number of public wireless access points that provide free access to the Internet. The wireless access points are located in the subway, shopping centers, airports, libraries, in the street, and so on.

A wireless access point generally includes an apparatus that provide wireless access to an already existing network (e.g., wireless or wireline). For transmission of information, wireless access points use radio waves from the frequency spectrum as determined by a standard, such as IEEE 802.11, GPRS, EDGE, HSPA and so on.

Wireless access points may be multifunctional, which means that they may not only organize a wireless network and provide the wireless connection of notebooks, computers, PDAs and other mobile devices of a local-area network, but also are able through various operating conditions to expand the existing wireless network, operate in a state of connection to the provider by a wireless network, operate as a wireless bridge for the connection of two wireline networks that are isolated from each other, and perform other functions.

In turn, mobile device users are eager to use wireless access points to access the Internet. Mobile device users take advantage of the opportunity to go online in order to chat on social networks, read the news, check email, perform bank transactions, and so on.

It must be kept in mind that a user, by connecting to a wireless access point, runs the risk of being tricked and user's activity on the network may be accessible to third parties. The need therefore arises to warn the user as to the possible consequences of using wireless access points and to inform the user when a selected access point is trusted (e.g., secure).

SUMMARY

Disclosed are example aspect of systems, methods and computer program products for determining trusted wireless access points. The technical result of the disclosed aspects is to increase the degree of protection of the network connection of a mobile device to a network resource when using a wireless access point, when more than one wireless access point are available, by determining on the mobile device requesting a connection trusted wireless access points that are acceptable for establishing the connection to the network resource.

In one aspect, an example method for determining trusted wireless access points includes: obtaining a plurality of access point characteristics of the one or more wireless access points; obtaining a plurality of network resource characteristics for connecting to the network resource; comparing the plurality of access point characteristics and the plurality of network resource characteristics; determining based on the comparison at least one trusted wireless access points that is acceptable for establishing a connection to the network resource; and establishing a connection to the network resource via the trusted wireless access points.

In one aspect, the access point characteristics may include at least one of an address of an access point, an identifier of the access point, a cell identifier, a service set identification (SSID), a base service identification (BSID), a control scheme for encryption keys, a network protection technology, a hidden SSID, a channel traffic capacity of the access point, a number of unique users having connected to the access point during existence of the access point, physical location of the access point, a type of wireless network served by the access point, an identifier of a communications operator of the access point, a firmware version of the access point, a period of operation of the access point, a number of security incidents at the access point, a level of trust of users of the access point, and a frequency of changing of setup parameters of the access point.

In one aspect, comparing the access point characteristics and the network resource characteristics may include: calculating an access point coefficient based on the access point characteristics; and calculating a network resource coefficient based on the network resource characteristics.

In another aspect, comparing the access point characteristics and the network resource characteristics may further include: assigning a first value to an access point characteristic and a second value to a corresponding network resource characteristics; and attributing a significance factor to the access point characteristic and the corresponding network resource characteristics, wherein a value of the significance factor is based on an importance of the characteristic to the network resource.

In one aspect, the access point coefficient may be calculated based on a product of the first value and the significance factor, and wherein the network resource coefficient is calculated based on a product of the second value and the significance factor.

In one aspect, an access point may be determined to be acceptable for establishing a connection to the network resource if the access point coefficient is equal or greater than the network resource coefficient, and wherein an access point is determined to be unacceptable for establishing a connection to the network resource if the access point coefficient is less than the network resource coefficient.

In one aspect, if a plurality of access points determined to be acceptable for establishing a connection to the network resource, then the method may further include selecting an access point of the plurality of access points with a highest access point coefficient to establish the connection to the network resource.

In another aspect, an example system for determining trusted wireless access points includes a processor configured to identify one or more wireless access points are available to connect to a network resource; obtain a plurality of access point characteristics of the one or more wireless access points; obtain a plurality of network resource characteristics for connecting to the network resource; compare the plurality of access point characteristics and the plurality of network resource characteristics; determine based on the comparison at least one trusted wireless access points that is acceptable for establishing a connection to the network resource; and establish a connection to the network resource via the trusted wireless access points.

In another aspect, an example computer program product, stored on a non-transitory computer readable medium, for determining trusted wireless access points, includes computer executable instructions for: identifying one or more wireless access points are available to connect to a network resource; obtaining a plurality of access point characteristics of the one or more wireless access points; obtaining a plurality of network resource characteristics for connecting to the network resource; comparing the plurality of access point characteristics and the plurality of network resource characteristics; determining based on the comparison at least one trusted wireless access points that is acceptable for establishing a connection to the network resource; and establishing a connection to the network resource via the trusted wireless access points.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for determining trusted wireless access points. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
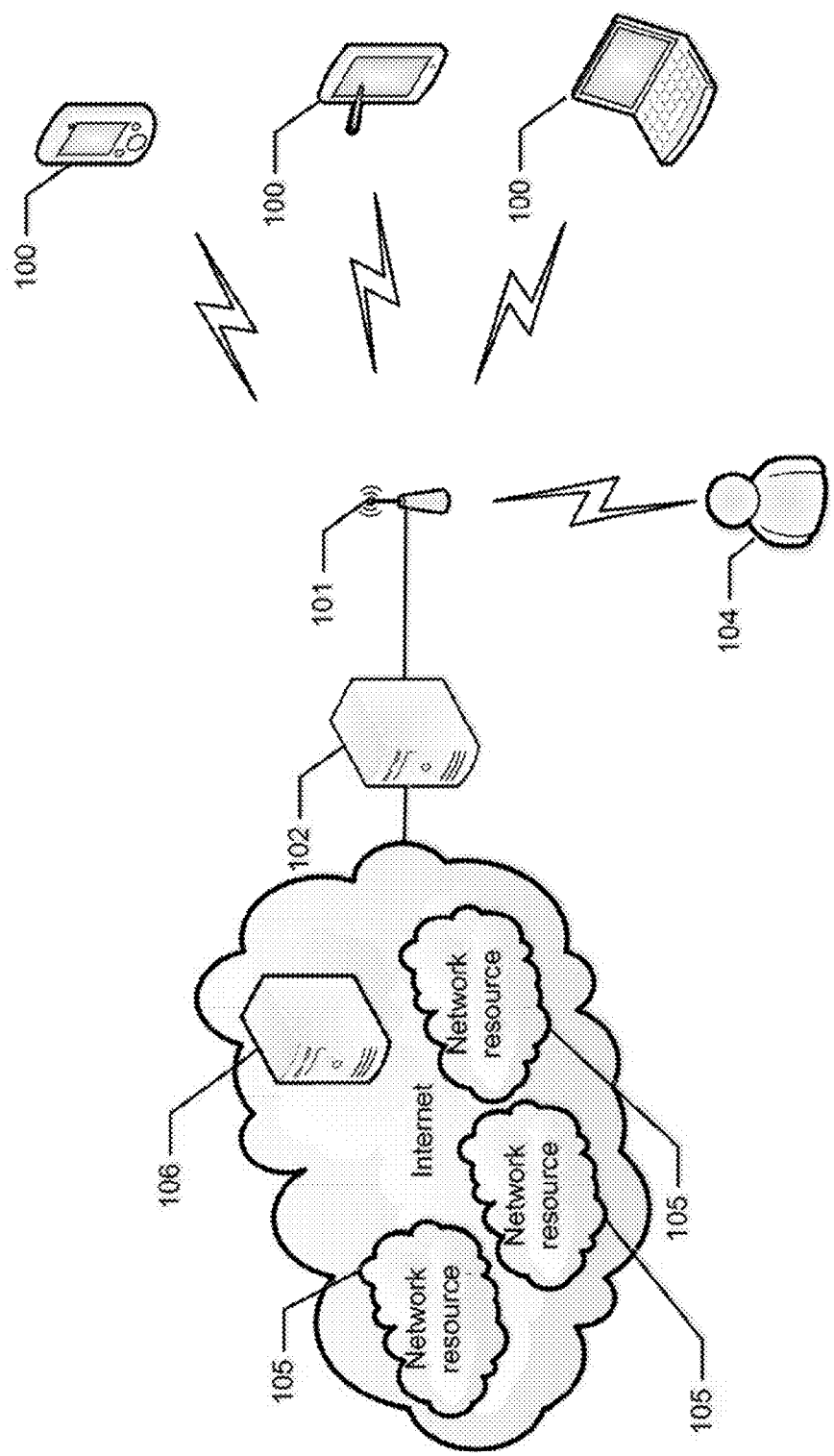
FIG. 1 illustrates an example aspect of a public zone of access to the Internet including a system for determining trusted wireless device access points.

FIG. 1 presents an example aspect of a public zone of wireless access to the Internet by means of a wireless access point 101 with connection standard IEEE 802.11(Wi-Fi). Wi-Fi technology may provide devices 100 with access to network resources 105 of the Internet by the radio access protocol of standard 802.11xx within the operating radius of the wireless access point 101. A public zone of wireless access includes a territory (e.g., the premises of a train station, office, school auditorium, cafe, and so forth) covered by a wireless Wi-Fi network on which a user, having a device 100 with a wireless adapter of the Wi-Fi standard, may connect to network resources 105 through the Internet, for example. Such network resources in a particular instance may include a device or data stored on a certain system component of the computer system to which remote access may be provided from another computer, for example, via the Internet. Access to the network resources may be free or limited and it occurs by going to the network address of the network resource, where the network address is a unique identifier of the resource. An example of an address might be the IP (Internet Protocol Address), a unique network address of a node in a computer network built by the IP protocol, such as 208.73.211.176, or the URL (Uniform Resource Locator), a universal network resource indicator which is the standardized method of notation for a resource address on the Internet, such as "http://www.kaspersky.com".

In one example aspect, to organize a public zone, the access point may be connected to the Internet service provider 102 using one of the standard methods: ADSL or 3G technology, or the Fast Ethernet local-area network.

When connecting the device 100 to the network resources 105 by using a public wireless access point 101, all of the network traffic between the device 100 and the network resource 105 goes through the given access point, and the traffic may also contain personal data. Therefore, if the access point is compromised (e.g., a hacker has gained privileged access to the access point), inadequately protected, or created specifically by a hacker, the hacker 104 may gain access to the traffic going to and from the device 100. Therefore, before establishing a connection to network resource 105 via the wireless access point 101, it is important to understand how secure the access point 101 is, and whether it may be trusted, i.e., may the given access point be used to transmit confidential data without risk of third parties gaining access to this data.

Figure 2:
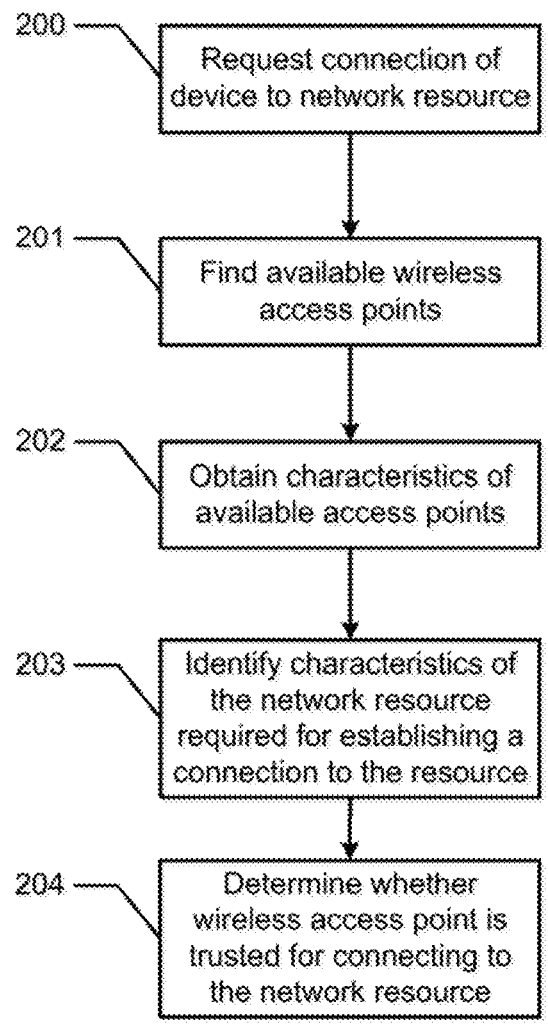
FIG. 2 illustrates an example aspect of a method for determining trusted wireless access points.

FIG. 2 depicts example aspect of a method for determining trusted wireless access points. In step 200, the device 100 requests a connection to the network resource 105. In a particular instance, a connection may be requested when a device user clicks on a hyperlink that refers to a network address, enters the network address on the address line of a Web browser of the device 100, and so forth. Next, in step 201, the device 100 searches, using known techniques, for available wireless access points that may be used to make the connection. In one example available access point may include a wireless access point, which is already used by the device 100 to connect to the network, such as the Internet. The device 100 searches for available access points of the network, such as Wi-Fi, LTE or GSM, and finds the available access points that may be used to make the connection. In step 202, the device 100 obtains characteristics of the identified wireless access points.

In one example aspect, the characteristics of the wireless access point may include various technical characteristics, including but, not limited to:

the public address of the wireless access point;
    the identifier of the transmitting and receiving equipment or the address of the access point;
    the identification code of the cellular base station;
    the cell identifier;
    the SSID (Service Set Identification);

the BSID (Base Service Set Identification);
the control scheme for the encryption keys (LAP, PSK);
the network protection technology (WPA, WPA2);
hidden SSID (for networks not publishing their SSID);
the channel traffic capacity;
the physical location of the device (street, facility, library, subway, and so on);
the type of wireless network of the wireless access point;
the identifier of the communications operator;
the firmware version;
the default password;
the presence of firmware vulnerabilities In another example aspect, the characteristics of the wireless access point may include various statistical characteristics, including but not limited to:
the period of operation (e.g., how long has the given access point been known, for example, to the security server 106)
the existence of incidents involving security (e.g., previous data theft when connecting to the given point)
the level of trust of users in the access point (which may be obtained from the security server 106 for example)
the frequency of changing the setup parameters of the access point (e.g., protocols, passwords, public addresses)

In one example aspect, the device 100 may receive these characteristics independently, for example, the type of network and the name of the network, using its own technical capabilities, if it cannot obtain all the necessary characteristics (due to, for example, limited technical capabilities of the device), the device 100 may a request a secure connection (e.g., WPA, WPA2) with the security server 106 and, after transmitting the identification data of the wireless access point 101, which may include unique technical characteristics or a hash calculated from them, the device 100 may receive the necessary characteristics from the server 106. In one example aspect, the device 100 may also send to the server 106 information about firmware of the wireless access point 101, and the server 106 may return information as to the presence of vulnerabilities for this firmware. The device 100 may use one of the identified wireless access points to establish a secure connection with the security server 106. Also, if the device 100 has previously reviewed the wireless access point 101, the device 100 in a particular instance may save the previously obtained characteristics of the wireless access point 101.

In step 203, the device 100 may obtain characteristics of the network resource required for establishing a connection to the network resource 105. For example, when a connection to a new network resource is requested, which requires no authentication, the requirements for the wireless access point 101 may be mainly dependent on the traffic capacity of the wireless channel. In another example, when the device 100 is accessing an Internet banking service, the requirements for the security of the wireless access point 101 that provides access to the banking service may be more stringent. The characteristics of the network resource 105 may be obtained, for example, from the network resource, a computer (e.g., web server) that hosts the resource, a network firewall that protects the network resource, or the security server 106.

In one example aspect, the required characteristics of the network resource may be then stored on the device 100 and systematized by type of network resource, for example:
services that perform financial transactions;
services requiring authentication;
file and video hosting services;
other types of resources.

In another aspect, the required characteristics ay be saved on the security server 106.

Finally, at step 204, the device 100 determines whether any of the identified wireless access points 101 can be trusted (i.e., acceptable) to establish a connection to the network resource 105. This analysis may be made by comparing the characteristics of the identified wireless access points with the required characteristics for the network resource to which connection is requested. In one example aspect, the analysis may be done using pairwise comparing of the required characteristics with the characteristics obtained from the identified wireless access points 101. For example, a connection is requested to a network resource with the address "http://superonlinebank.com", the required characteristics of the network resource are: network protection technology, such as WPA or WPA2, popularity of the access point over 2500 unique users, and traffic capacity over 1 Mbit/s. The characteristics obtained from one available wireless access point 101 are support of WPA protocol, popularity of 200 users, and channel capacity of 10 Mbit/s, By pairwise comparing of these characteristics, it is determined that the current value of the available access point 101 in terms of the popularity characteristic is below what is required threshold, and so the given access point cannot be trusted for establishing a connection with the requested network resource.

In another example aspect, a coefficient of the network resource and a coefficient of the access point may be used for the comparison of the characteristics of the two. These coefficients may be obtained in one example aspect by one of the following methods: neural network, fuzzy logic, or summation considering the significance of the characteristics. The coefficient of the network resource may be calculated based on the required characteristics, while the coefficient of the access point may be calculated based on the obtained characteristics. Next, the coefficient of the network resource is compared with the coefficient of the access point and if the coefficient of the network resource is larger than the coefficient of the access point, then the access point cannot be used. For example, summation considering the significance of the characteristics may be performed as follows:

$$K_{s/p} = X_1 * K_{x1} + X_2 * K_{x2} + X_3 * K_{x3} + \ldots + X_n * K_{xn}, \text{ where:}$$

$K_s$—coefficient of the network resource;
$K_p$—coefficient of the access point;
$X_n$—significance factor;
$K_{xn}$—value of the characteristic.

The significance factor reflects the importance of the characteristic being used. This factor may be determined, for example, by the current security rules for network connections of organizations (such as banks) providing access to the requested network resource. Using this factor makes it possible to account for differences in the significance of the characteristics.

The calculation of coefficient $K_{s/p}$ the by the above technique is illustrated by the following example. A connection is requested to a network resource with the address "http://superonlinebank.com". The required characteristics for access to the network resource are: protocol used WPA or higher ($K_{x1}$), popularity of the access point over 2500 unique users having connected to the access point in the total time of existence of the access point ($K_{x2}$), traffic capacity of the access point is over 1 Mbit/s ($K_{x3}$). The determined values of the characteristics for the network resoruce are: $K_{x1}=1$ (WPA), $K_{x1}=2$ (WPA2), $K_{x2}=1$ (popularity >2500), $K_{x2}=0$ (popularity <2500), $K_{x3}=0.1$ (traffic capacity 1 Mbit/s). The significance factors may be assigned on the basis of the security requirements for network connections when using wireless access points, as determined for the group of network resources to which the resource http://superonlinebank.com belongs, and these factors in one example aspect may be saved on the security server 106: $X_1=3$, $X_2=1$, $X_3=1$. The required coefficient of the network resource $K_s$ may be determined as follows:

$$K_s = X_1 * K_{x1} + X_2 * K_{x2} + X_3 * K_{x3} = 3*1 + 1*1 + 1*0.1 = 4.1$$

Next, the coefficient of the access point is determined based on the obtained characteristics. The obtained characteristics are: protocol WPA, popularity 200, channel capacity 10 Mbit/s. The coefficient of the wireless access point $K_p$ may be determined may be determined as follows:

$$K_p = X_1 * K_{x1} + X_2 * K_{x2} + X_3 * K_{x3} = 3*1 + 1*0 + 1*(0.1*10) = 4.$$

It is evident from the calculations that the obtained coefficient of the access point $K_p$ is lower than the required coefficient of the network resource $K_s$, and therefore the available access point cannot be considered trusted and cannot be used to access the network resource.

In one example aspect, if a wireless access point already used for connecting the device 101 to the network is found to be trusted, it may be used for establishing a connection to the requested network resource 105.

Figure 3:
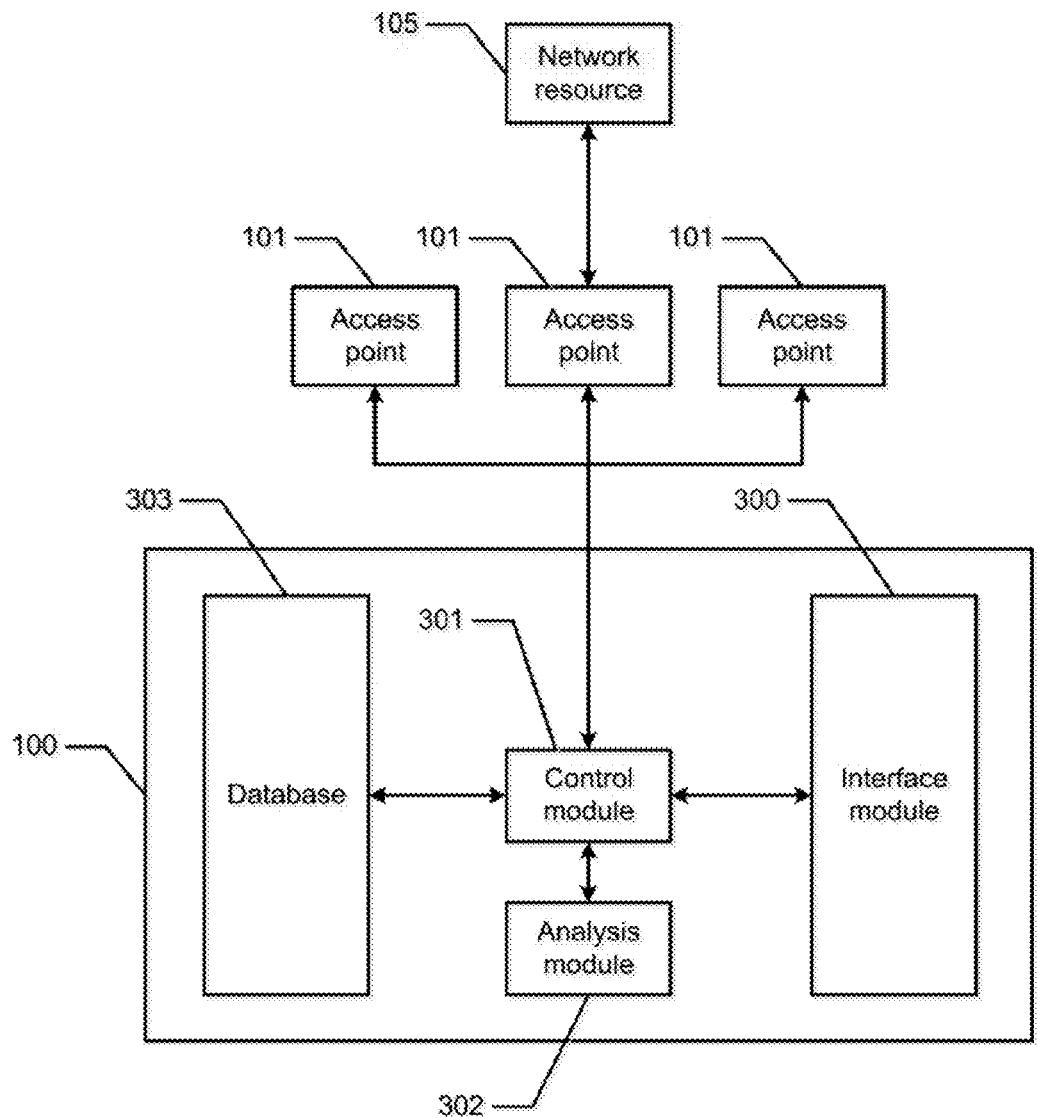
FIG. 3 illustrates an example aspect of a system for determining trusted wireless access points.

FIG. 3 illustrates an example aspect of a system for determining trusted wireless access points. The interface module 300 of the device 100 via a control module 301 requests access to a network resource 105. The control module 301 of the device 100 finds available wireless points 101 that may be used to establish the connection to the network resource 105. The control module 301 obtains the characteristics of the found wireless access points 101 and obtains the required characteristics for accessing the network resource 105. The control module 301 sends the obtained information to the analysis module 302, the analysis module 302 of the device 100 determines whether the access points 101 can be trusted (i.e., acceptable) for establishing the connection by comparing the obtained characteristics of the found access points with the required characteristics of the network resource. A database 303 may be used to store the information on the characteristics of the access points to which a previous connection was made and to store the required characteristics of the network resource 105. The control module 301 uses the database 303 to obtain the characteristics of the available access points 101 and the required characteristics of the network resources 105.

In one example aspect, a situation is possible where several available access points can be trusted (i.e., meet the required characteristics of the request network resource), in which case the device 101 may select to use the wireless access point with the highest coefficient of all available access points.

In one example aspect, the search for trusted wireless access points may be performed each time there is a connection to a new network resource. In the event that an access point already being used meets the required characteristics, it may continue to be used when connecting to the new network resource.

Figure 4:
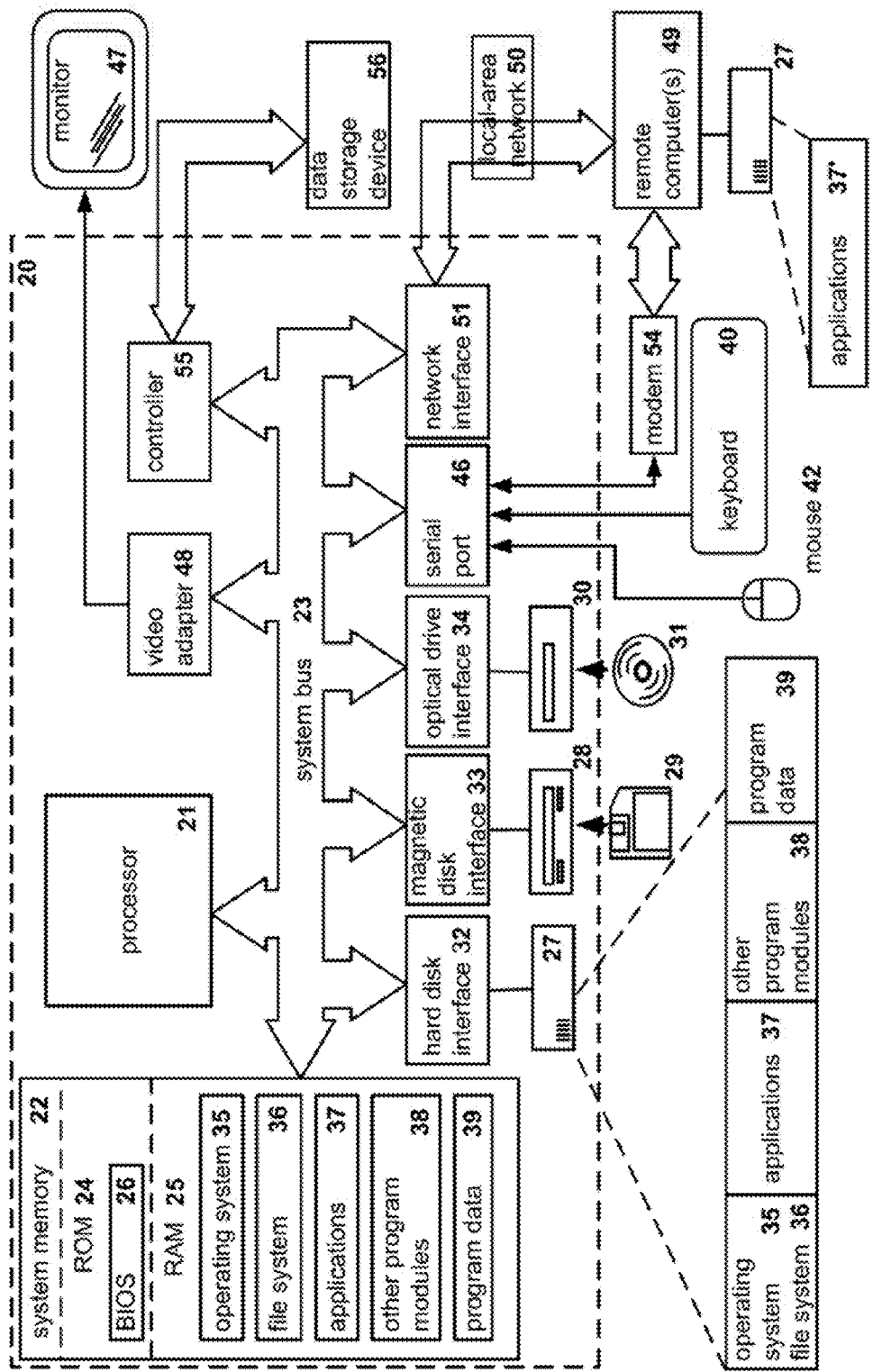
FIG. 4 illustrates an example of a general-purpose computer system on which are implemented systems and method's for determining trusted wireless device access points.

FIG. 4 shows an example of a general-purpose computer system (which may be a personal computer or a server) 20, which may be used to implement aspects of system and methods disclosed herein. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) may be used: microphone, joystick, game controller, scanner, and so on. Such input devices usually plug into the computer system 20 through a serial port 46, which in turn is connected to the system bus, but they may be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer may be equipped with other peripheral output devices (not shown), such as loudspeakers, a printer, and so on.

The personal computer 20 is able to work in a network environment, using a network connection to one or more remote computers 49. The remote computer (or computers) 49 are also personal computers or servers having the majority or all of the aforementioned elements in describing the nature of a personal computer 20, as shown in FIG. 4. Other devices may also be present in the computer network, such as routers, network stations, peer devices or other network nodes.

Network connections may form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 may employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium may comprise RAM, ROM, EEPROM, CD-ROM, Flash memory or other types of electric, magnetic, or optical storage medium, or any other medium that may be used to carry or store desired program code in the form of instructions or data structures and that may be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4 above). Accordingly, each module may be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for determining trusted wireless access points, the method comprising:
   identifying, by a mobile device, one or more wireless access points available to connect to a network to access a data hosted on a computer in the network;
   calculating an access point coefficient for each of the one or more identified wireless access points based on values representing a plurality of access point characteristics and further based on significance factors corresponding to the access point characteristics, wherein the plurality of access point characteristics include at least one of a period of operation of each of the one or more wireless access points, an existence of security incidents for each of the one or more wireless access points, a trust level for each of the one or more wireless access points, and a frequency of changing setup parameters of each of the one or more wireless access points; and
   calculating a network resource coefficient for the data hosted on the computer based on values representing a plurality of network resource characteristics and further based on significance factors corresponding to the network resource characteristics, wherein the plurality of network resource characteristics include network security requirements and authentication requirements to access the data;
   comparing, by the mobile device, each calculated access point coefficient to the calculated network resource coefficient;
   determining, based on the comparison of each calculated access point coefficient to the calculated network resource coefficient, at least one trusted wireless access point of the one or more identified wireless access points that is acceptable for establishing a connection to access the data hosted on the computer in the network responsive to the calculated access point coefficient of the trusted wireless access point being equal to or greater than the calculated network resource coefficient; and
   establishing a connection to the network via the trusted wireless access points to access the data hosted on the computer.

2. The method of claim 1, wherein the access point characteristics include at least one of an address of an access point, an identifier of the access point, a cell identifier, a service set identification (SSID), a base service identification (BSID), a control scheme for encryption keys, a network protection technology, a hidden SSID, a channel traffic capacity of the access point, a number of unique users having connected to the access point during existence of the access point, a physical location of the access point, a type of wireless network served by the access point, an identifier of a communications operator of the access point, a firmware version of the access point, a period of operation of the access point, a number of security incidents at the access point, a level of trust of users of the access point, and a frequency of changing of setup parameters of the access point.

3. The method of claim 1, wherein comparing the access point characteristics and the network resource characteristics further comprises:

assigning a first value to an access point characteristic and a second value to a corresponding network resource characteristics; and attributing a significance factor to the access point characteristic and the corresponding network resource characteristics, wherein a value of the significance factor is based on an importance of the characteristic to the data hosted on the computer.

4. The method of claim 3, wherein the access point coefficient is calculated based on a product of the first value and the significance factor, and wherein the network resource coefficient is calculated based on a product of the second value and the significance factor.

5. The method of claim 4, wherein an access point is determined to be unacceptable for establishing a connection to access the data hosted on the computer in the network if the access point coefficient is less than the network resource coefficient.

6. The method of claim 5, wherein if a plurality of access points is determined to be acceptable for establishing a connection to access the data hosted on the computer in the network, then selecting an access point of the plurality of access points with a highest access point coefficient to establish the connection to the network.

7. The method of claim 1, further comprising:

determining that the at least one trusted wireless access point is acceptable for establishing the connection to access the data if the comparing of the calculated access point coefficient to the calculated network resource coefficient indicates that the at least one trusted wireless access point satisfies the network security requirements and authentication requirements to access the data.

8. A system for determining trusted wireless access points, the system comprising:

a hardware processor configured to:

identify one or more wireless access points available to connect to a network to access a data hosted on a computer in the network;

calculate an access point coefficient for each of the one or more identified wireless access points based on values representing a plurality of access point characteristics and further based on significance factors corresponding to the access point characteristics, wherein the plurality of access point characteristics include at least one of a period of operation of each of the one or more wireless access points, an existence of security incidents for each of the one or more wireless access points, a trust level for each of the one or more wireless access points, and a frequency of changing setup parameters of each of the one or more wireless access points; and calculate a network resource coefficient for the data hosted on the computer based on values representing a plurality of network resource characteristics and further based on significance factors corresponding to the network resource characteristics, wherein the plurality of network resource characteristics include network security requirements and authentication requirements to access the data;

compare each calculated access point coefficient to the calculated network resource coefficient;

determine based on the comparison of each calculated access point coefficient to the calculated network resource coefficient, at least one trusted wireless access point of the one or more identified wireless access points that is acceptable for establishing a connection to access the data hosted on the computer in the network responsive to the calculated access point coefficient of the trusted wireless access point being equal to or greater than the calculated network resource coefficient; and establish a connection to the network via the trusted wireless access points to access the data hosted on the computer.

9. The system of claim 8, wherein the access point characteristics include at least one of an address of an access point, an identifier of the access point, a cell identifier, a service set identification (SSID), a base service identification (BSID), a control scheme for encryption keys, a network protection technology, a hidden SSID, a channel traffic capacity of the access point, a number of unique users having connected to the access point during existence of the access point, a physical location of the access point, a type of wireless network served by the access point, an identifier of a communications operator of the access point, a firmware version of the access point, a period of operation of the access point, a number of security incidents at the access point, a level of trust of users of the access point, and a frequency of changing of setup parameters of the access point.

10. The system of claim 8, wherein to compare the access point characteristics and the network resource characteristics, the processor further configured to:

assign a first value to an access point characteristic and a second value to a corresponding network resource characteristics; and attribute a significance factor to the access point characteristic and the corresponding network resource characteristics, wherein a value of the significance factor is based on an importance of the characteristic to the data hosted on the computer.

11. The system of claim 10, wherein the access point coefficient is calculated based on a product of the first value and the significance factor, and wherein the network resource coefficient is calculated based on a product of the second value and the significance factor.

12. The system of claim 11, wherein an access point is determined to be unacceptable for establishing a connection to access the data hosted on the computer in the network if the access point coefficient is less than the network resource coefficient.

13. The system of claim 12, wherein if a plurality of access points is determined to be acceptable for establishing a connection to access the data hosted on the computer in the network, then selecting an access point of the plurality of access points with a highest access point coefficient to establish the connection to the network.

14. The system of claim 8, wherein the processor further configured to:

determine that the at least one trusted wireless access point is acceptable for establishing the connection to access the data if the comparing of the calculated access point coefficient to the calculated network resource coefficient indicates that the at least one trusted wireless access point satisfies the network security requirements and authentication requirements to access the data.

15. A computer program product stored on a non-transitory computer readable medium, for determining trusted wireless access points, wherein the computer program product includes computer executable instructions for:

identifying one or more wireless access points available to connect to a network to access a data hosted on a computer in the network;

calculating an access point coefficient for each of the one or more identified wireless access points based on values representing a plurality of access point characteristics and further based on significance factors corresponding to the access point characteristics, wherein the plurality of access point characteristics that include at least one of a period of operation of each of the one or more wireless access points, an existence of security incidents for each of the one or more wireless access points, a trust level for each of the one or more wireless access points, and a frequency of changing setup parameters of each of the one or more wireless access points; and calculating a network resource coefficient for the data hosted on the computer based on values representing a plurality of network resource characteristics and further based on significance factors corresponding to the network resource characteristics, wherein the plurality of network resource characteristics include network security requirements and authentication requirements to access the data;

comparing each calculated access point coefficient to the calculated network resource coefficient;

determining based on the comparison of each calculated access point coefficient to the calculated network resource coefficient, at least one trusted wireless access point of the one or more identified wireless access points that is acceptable for establishing a connection to access the data hosted on the computer in the network responsive to the calculated access point coefficient of the trusted wireless access point being equal to or greater than the calculated network resource coefficient; and establishing a connection to the network via the trusted wireless access points to access the data hosted on the computer.

16. The computer program product of claim 15, wherein comparing the access point characteristics and the network resource characteristics further comprises:

assigning a first value to an access point characteristic and a second value to a corresponding network resource characteristics; and attributing a significance factor to the access point characteristic and the corresponding network resource characteristics, wherein a value of the significance factor is based on an importance of the characteristic to the data hosted on the computer.

17. The computer program product of claim 16, wherein the access point coefficient is calculated based on a product of the first value and the significance factor, and wherein the network resource coefficient is calculated based on a product of the second value and the significance factor.

18. The computer program product of claim 17, wherein an access point is determined to be unacceptable for establishing a connection to access the data hosted on the computer in the network if the access point coefficient is less than the network resource coefficient.

19. The computer program product of claim 18, wherein if a plurality of access points is determined to be acceptable for establishing a connection to access the data hosted on the computer in the network, then selecting an access point of the plurality of access points with a highest access point coefficient to establish the connection to the network.

20. The computer program product of claim 15, wherein the computer program product further includes computer executable instructions for:

determining that the at least one trusted wireless access point is acceptable for establishing the connection to access the data if the comparing of the calculated access point coefficient to the calculated network resource coefficient indicates that the at least one trusted wireless access point satisfies the network security requirements and authentication requirements to access the data.

\* \* \* \* \*